US007320026B2

(12) United States Patent
Adamczyk

(10) Patent No.: US 7,320,026 B2
(45) Date of Patent: Jan. 15, 2008

(54) INTERSYSTEM MESSAGING USING ENUM STANDARD

(75) Inventor: Maria Adamczyk, Alpharetta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 633 days.

(21) Appl. No.: 10/184,759

(22) Filed: Jun. 27, 2002

(65) Prior Publication Data
US 2004/0003114 A1 Jan. 1, 2004

(51) Int. Cl.
G06F 15/16 (2006.01)
H04M 1/64 (2006.01)

(52) U.S. Cl. .............. 709/219; 709/206; 709/227; 379/88.17

(58) Field of Classification Search .......... 379/67.1, 379/88.13–88.17; 709/204–207, 217–219, 709/227–229
See application file for complete search history.

(56) References Cited

U.S. PATENT DOCUMENTS

| 5,515,422 | A  | * | 5/1996  | MeLampy et al. ....... 379/88.25 |
| 6,539,077 | B1 | * | 3/2003  | Ranalli et al. ............. 379/67.1 |
| 6,728,357 | B2 | * | 4/2004  | O'Neal et al. ......... 379/201.04 |
| 6,748,057 | B2 | * | 6/2004  | Ranalli et al. ........... 379/88.17 |
| 6,751,453 | B2 | * | 6/2004  | Schemers et al. ........ 455/412.1 |
| 6,810,113 | B1 | * | 10/2004 | Bedingfield et al. ..... 379/88.18 |
| 6,826,264 | B2 | * | 11/2004 | Valco et al. ............... 379/67.1 |
| 6,839,421 | B2 | * | 1/2005  | Ferraro Esparza et al. ...... 379/220.01 |
| 6,865,266 | B1 | * | 3/2005  | Pershan ................. 379/221.13 |
| 6,882,708 | B1 | * | 4/2005  | Bedingfield et al. ..... 379/88.18 |
| 6,891,931 | B1 | * | 5/2005  | Adamczyk et al. ........... 379/69 |
| 6,947,528 | B1 | * | 9/2005  | Ko et al. ................. 379/88.17 |
| 6,947,738 | B2 | * | 9/2005  | Skog et al. .............. 379/88.11 |
| 6,968,050 | B1 | * | 11/2005 | Pershan et al. ............. 379/196 |
| 2002/0110231 | A1 | * | 8/2002 | O'Neal et al. ......... 379/201.01 |
| 2003/0019347 | A1 | * | 1/2003 | Weiner et al. ................ 84/609 |
| 2003/0059004 | A1 | * | 3/2003 | Jiang et al. ............. 379/88.17 |
| 2003/0217096 | A1 | * | 11/2003 | McKelvie et al. .......... 709/202 |

OTHER PUBLICATIONS

Klensin, J. History and Context of Telephone Number Mapping (ENUM) Operational Decisions, FRC 3245 Mar. 2002.*
Faltsrom, Patrik, ENUM Presentation Slides © 2000 Cicso Systems.*
Mealling et al. "The Naming Authority Pointer NAPTR DNS Resource Record"; RFC 2915; Sep. 2000.*
Lightweight Directory Access Protocol, by W. Yeong, T. Howes, and S. Kille, ISODE Consortium, Mar. 1995, www.ietf.org/frc/rfc1777.txt.
Voice Profile for Internet Mail—version 2, G. Vaudreuil and G. Parsons, Northern Telecom, Sep. 1998, www.ema.org/vpim/specs/reference/rfc4241.txt.
E.164 number and DNS, P. Faltsrom, Cisco System Inc., Sep. 2000, www.ietf.org/rfc/rfc2916.tst.
VPIM Press Information, "BellSouth Takes AIM at University Messaging", PR Newswire Sep. 14, www.ema.org./vpim/press/09-14-1998.html.

* cited by examiner

Primary Examiner—Joseph E. Avellino
(74) Attorney, Agent, or Firm—Merchant & Gould

(57) ABSTRACT

A system and method for transforming voice mail messages into a package capable of being parsed and read by different proprietary voice mail systems. More particularly, the present invention relates to a system and method that allows for intersystem messaging through the use of the ENUM standard wherein the ENUM standard is used to locate the specific address information for a destination platform and/or subscriber.

20 Claims, 4 Drawing Sheets

INTERSYSTEM MESSAGING USING ENUM STANDARD

FIELD OF THE INVENTION

The present invention relates to voice message systems. In particular, the present invention relates to protocols used in transferring voice messages between proprietary voice message systems.

BACKGROUND OF THE INVENTION

In today's work environment voice mail has become a very important and useful tool. Essentially voice mail relates to voice messages left by a caller on a telephone system, where the person called is able to retrieve the voice mail later. Many voice mail messages are digitized and stored in a computer system as a digital signal, such that the voice mail subscriber may retrieve the messages using a telephone or a computer system, such as through email.

Most businesses have the ability to store voice mail messages for their employees. These businesses create, in essence, an internal, proprietary communication or messaging system. These internal communication systems receive telephone calls from the outside world over the public switched telephone network (PSTN) and transform the voice mail into a digital signal that is stored using the proprietary messaging system. Once a voice mail is stored on the proprietary system, a voice mail subscriber, e.g., an employee of that company, can forward the voice mail to other voice mail subscribers or employees of that company as long as they are subscribers of the company's messaging system.

In order to achieve forwarding type functions, the voice mail system typically maintains a directory of various subscribers or employees and their respective phone numbers. This directory is used to route incoming calls to the proper telephone and to transfer or forward a voice mail message to another subscriber within the system. In essence, a subscriber on the system is able to select functionality from the phone itself and transfer or forward an existing voice mail that was assigned to her own phone number to another phone number within the system itself.

Unfortunately, however, voice mail subscribers of one proprietary system are not able to forward voice mail messages from their proprietary system to a user on a separate or different voice mail system. In particular, the existence of the closed or proprietary voice mail system creates a system of incompatibility across the various proprietary voice mail communication systems.

It is with respect to these and other considerations that the present invention has been made.

SUMMARY OF THE INVENTION

In accordance with the present invention, the above and other problems are solved by a system and method for transforming voice mail messages into a package capable of being parsed and read by different proprietary voice mail systems. More particularly, the present invention relates to a system and method that allows for intersystem messaging through the use of the ENUM standard wherein the ENUM standard is used to locate the specific address information for a destination platform and/or subscriber.

In accordance with a particular embodiment, the present invention relates to systems and methods for sending messages from one platform to a particular subscriber on another platform. The systems and methods involve sending one or more requests for subscriber address information to a domain name server wherein the request identifies a telephone number for the subscriber. In response, address information is received from the domain name server related to the subscriber that the message can be sent, using the address information, to the other platform. In an embodiment, the message is sent in a predetermined format, such as voice profile for internet mail (VPIM) format. Also, the standard used to resolve the address information using the subscriber's telephone number relates to the ENUM standard.

In accordance with other aspects, the address information received from the domain name server relates to a directory server, such as a lightweight directory assistance protocol (LDAP) server, associated with the subscriber. This embodiment also involves querying the directory server for specific address information for the subscriber, wherein the query includes the telephone number for the subscriber. In response, an internet address for the subscriber is received from the directory server and sending the message uses the internet address for the subscriber. Once the other platform receives the message, it routes the message to the subscriber. In an embodiment, all the communications, such as the requests and message transfers occur over the Internet. Also, embodiments of the invention relate to sending messages from one type of platform to another type of platform. For instance, one platform may be a voice mail only type system and the other may be a unified messaging platform. In such a case, the destination subscriber may relate to a computer system and/or a telephone system.

In accordance with yet other aspects, the present invention relates to a computer platform providing intersystem messaging, the platform having one or more subscribers and wherein the subscribers use the platform to access messaging services. The platform has a subscriber communications module for communicating information between a subscriber and the platform and a message delivery module for sending a message from within the platform to a destination platform in a predetermined format, such as in VPIM format. The platform also has a destination address resolution module for resolving the destination address for a subscriber associated with the destination platform, the destination address resolution module using the ENUM standard to resolve the destination address information. The destination address resolution module may involve a domain name server communications module for communicating with a domain name server to get the address of a directory server and a directory server communications module for communicating with a directory server to resolve the address information for the destination subscriber. As stated above, the platforms may be either voice mail only platforms, unified messaging platforms and/or some other type of messaging platform.

The invention may be implemented as a computer process, a computing system or as an article of manufacture, such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized

DETAILED DESCRIPTION OF THE INVENTION

Figure 1:
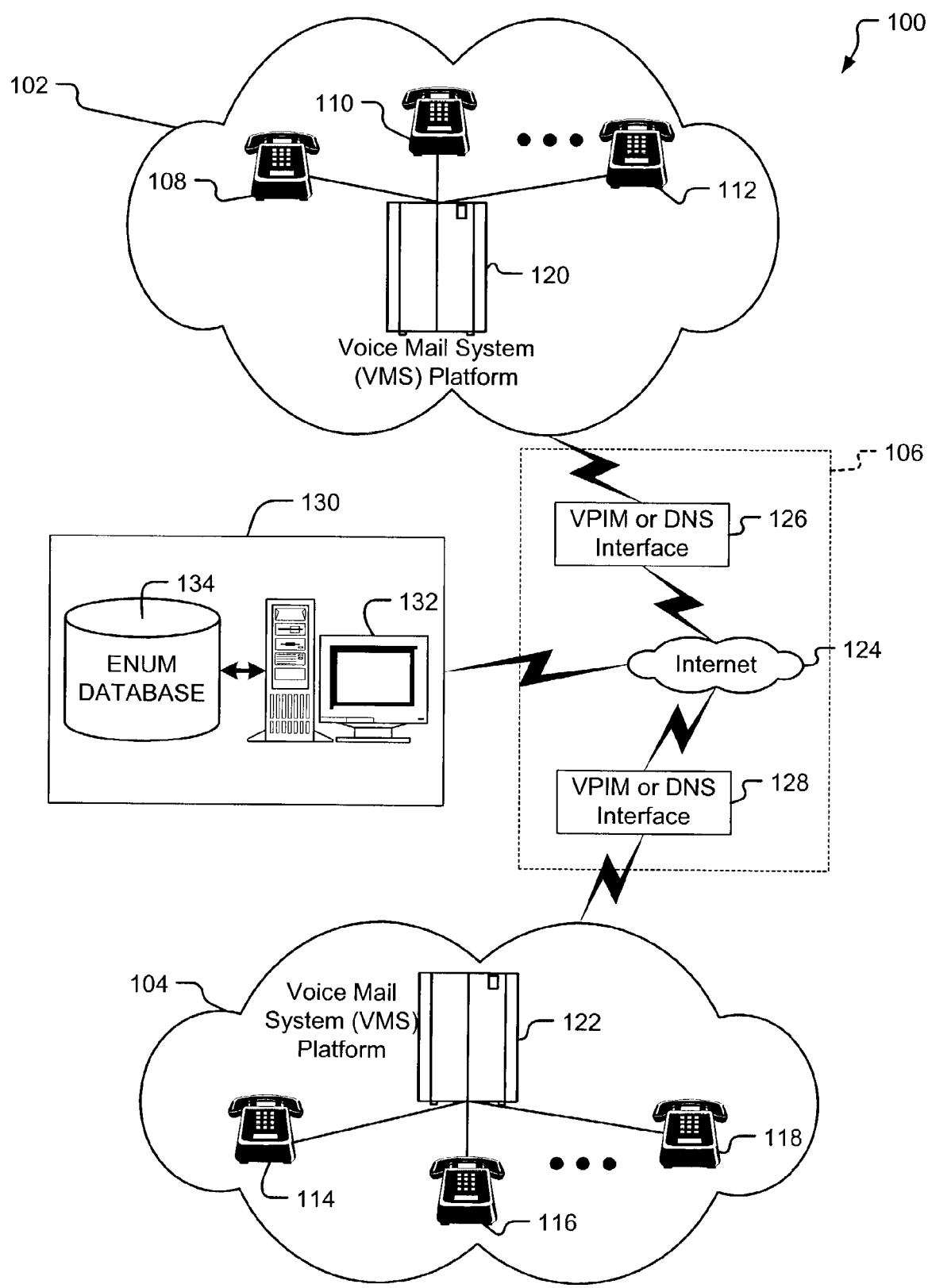
FIG. 1 is a high level environmental depiction of a plurality of voice mail systems communicating in accordance with the present invention.

A communication environment 100 incorporating aspects of the present invention is shown in FIG. 1. The environment 100 has a first voice mail proprietary system 102 and a second voice mail proprietary system 104. The voice mail systems connect through a network interface or transport layer 106. In an embodiment, the voice mail system 102 is different, and uses different communication standards than voice mail system 104. In alternative embodiments, the systems may share some common characteristics, but in general, the two systems 102 and 104 relate to separate voice mail systems. Although systems 102 and 104 are different, in an embodiment of the invention, voice mail type messages can be shared between the different voice mail systems 102 and 104.

In accordance with aspects of the present invention, each of the voice mail systems 102 and 104 has one or more voice mail subscribers. For instance, voice mail system 102 has voice mail subscribers 108, 110 and 112, while voice mail system 104 has subscribers 114, 116 and 118. As indicated by the ellipses in FIG. 1, each system 102 and 104 may have more than the three subscribers shown. Indeed, many systems accommodate hundreds of subscribers or more. Although not required, each subscriber typically relates to a particular employee of the company owning the system, such as system 102 and 104. Employees, for instance, may have a particular phone number assigned to them, which is a subscription to the messaging system. The subscription, through the phone number, allows the employee to access voice mail, save messages and forward voice mail messages to others on the system.

Each subscriber could be either a voice mail only subscriber, which provides for storing and sending voice and fax messages. In another embodiment, the subscribers may be unified messaging subscribers such messages may be either voice, fax or email type messages. It should be noted that in some embodiments, voice mail only subscribers may transfer messages to other subscribers that are not voice mail only subscribers and vice versa.

In order to manage the messaging (i.e., the receiving, saving, routing, forwarding, etc.) that occurs within each system 102 and 104 incorporates a voice mail system (VMS) platform, such as platform 120 for system 102 and platform 122 for system 104. The platforms 120 and 122 are typically deemed proprietary since each platform 120 and 122 represents messaging systems that do not provide others access to internal protocols, i.e., the protocols used within each system 120 and 122. In many of these systems 120 and 122, the messages are stored on the VMS platforms using a proprietary and vendor specific mechanism, therefore, making it generally impossible for outside systems to retrieve and process messages on that system.

When subscriber 108 calls subscriber 114, the call is routed through the public switched telephone network (PSTN) to the other subscriber's Central Office (CO, not shown). Upon receiving the call, the CO may simply route the call to the dedicated subscriber telephone, such as telephone 114. However, if there is no answer, the caller may elect to leave a voice mail message. Leaving a voice mail message involves accessing the voice mail system on platform 122. Internally, and typically in a proprietary manner, the platform 122 communicates with the caller and stores a digital voice message for the subscriber. Additionally, should the subscriber 114 decide to forward the voice mail to another subscriber, e.g., to subscriber 116 and/or 118, such internal routing is typically also proprietary in nature.

In an embodiment of the invention, subscribers on one system, such as subscribers 108, 110 and 112 on system 102, can send messages to subscribers on another system, such as to subscribers 114, 116 and 118. More particularly, voice mail messages may be forwarded by the subscribers from one platform 120 to another platform 122, where the platform 122 can route the message to the proper subscriber.

In order to achieve such interoperability, the platforms 120 and 122 have communication capabilities with a common distributed network system, such as the Internet 128. In an embodiment, each platform 120 and 122 communicates with the Internet 128 through a VPIM (Voice Profile for Internet Mail) or DNS (Domain Name System) interface, such as interfaces 126 and 128. VPIM is a standard that provides format protocols such that messages sent by one system, such as system 102 can be understood by system 104. That is, any other system that understands VPIM messages can receive a VPIM message. The VPIM interfaces 126 and 128 provide the packaging or formatting to turn a message received from a system into a VPIM message or to turn a VPIM message into proprietary format if desired when receiving a message. Indeed, when sending a message, the VPIM interface may provide much of the functionality required to send the message to another system. The VPIM interfaces operate according to the Internet Protocol (IP) and therefore require that the sender provide a proper IP address for the subscriber that is to receive the message.

In order to determine where a message is to be sent, the present invention uses the ENUM standard by way of an ENUM system 130 that incorporates an ENUM server 132 and an ENUM database 134. The ENUM standard allows a user to map between a telephone number and an IP (Internet Protocol) address. ENUM was originally developed in the IETF and documented in RFC 2916.

ENUM itself is, from a narrow technical point of view, just a set of conventions for representing telephone numbers as identifiers in the Internet's standard and widely-deployed Domain Name System (DNS). ENUM takes a complete, international telephone number and resolves it to a fully qualified domain name address using a Domain Name Service (DNS)-based architecture. With ENUM registration of telephone numbers, many systems such as a subscriber's email, fax, instant messenger, and phone could all be reachable by using the same telephone number.

The workings of ENUM are designed to be relatively invisible to both user and subscriber. The IP network will be accessible, either by use of an Internet-enabled telephone, or from a standard telephone that has access to either a soft switch or to a circuit switch that has had IP-enabling software added to it. It is important to note that with ENUM a call placed from an Internet-enabled telephone will be able to reach the PSTN if the phone number cannot be found on the Internet.

Stated another way, ENUM may be thought of as a protocol whereby a Domain Name System (DNS) can be used for identifying available services connected to one E.164 number. Specifically through transformation of E.164 numbers into DNS names and the use of existing DNS services like delegation through Name Server (NS) records, and use of Naming Authority Pointer (NAPTR) records in DNS, one can look up what services are available for a specific domain name (E.164 number) in a decentralized way with distributed management of the different levels in the lookup process. Therefore, ENUM allows the DNS infrastructure to be used to find a specific IP address given a telephone number, allowing an end user to type a telephone number into a Web browser and access a URL listing the available Internet resources for that number, such as an IP telephony address, e-mail address, Web address, or the address of a directory server.

In a particular embodiment, a directory server, such as an LDAP (Lightweight Directory Access Protocol) server, not shown, may be associated with each platform 120 and 122. The LDAP is a protocol for accessing Internet or online directory functionality. LDAP typically operates over TCP, and can be used to access a standalone LDAP directory services or to access other services. LDAP is a well-known protocol for finding domain names of particular Internet addresses. Using a typical DNS server, the platform 120 may query the DNS server to obtain the address information of the LDAP server associated with the other platform, e.g., platform 122. The LDAP directory service is based on a client-server model. One or more LDAP servers contain the data making up the LDAP directory tree. The server responds with the answer, or with a pointer to where the client can get more information (typically, another LDAP server).

In operation, as discussed in more detail below, when forwarding a message to another system, such as from platform 120 to platform 122, the platform 120 first queries the DNS server, using only a phone number, to obtain the address for the LDAP server associated with the other platform 122, i.e., the LDAP server that stores all the addresses of subscribers on platform 122. Upon receiving the IP address for the LDAP server associated with the other platform 122, platform 120 queries that LDAP server for the domain name of the VMS platform 122. Upon receiving the domain name, the platform 120 provides the message in VPIM format, with the newly discovered destination information, to the other platform 122 over the Internet.

Figure 2:
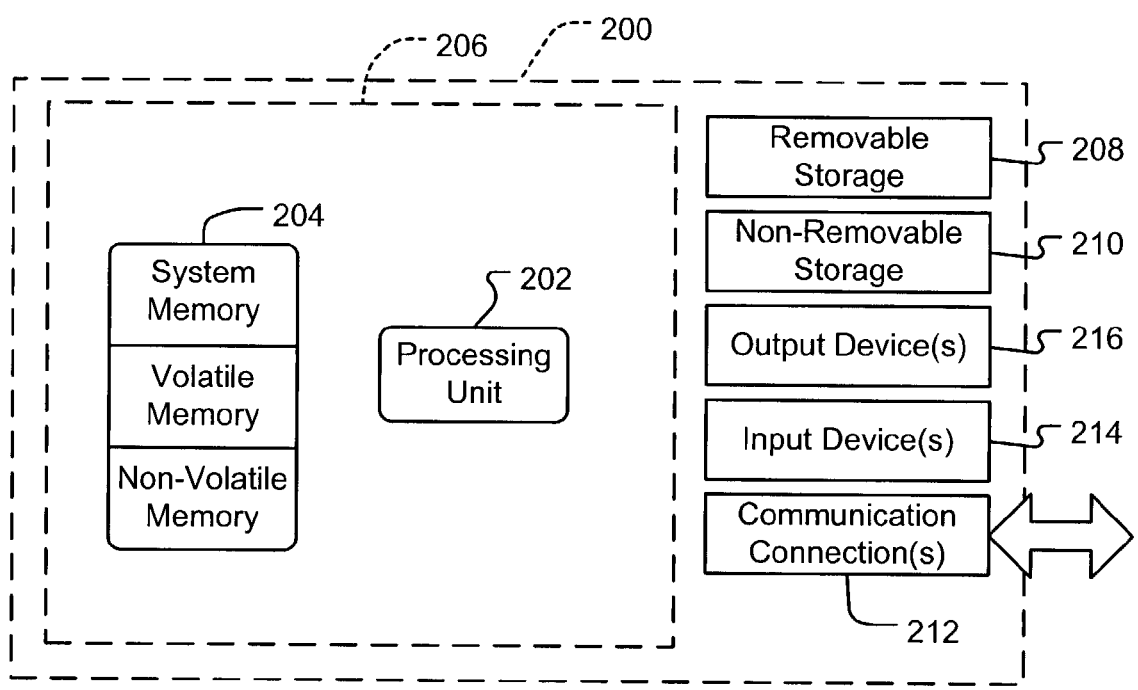
FIG. 2 depicts a computer system that may be used in accordance with particular aspects of the present invention.

The computer systems, such as 120, 122 and 132 may be represented by the computer system 200 shown in FIG. 2. The system 200 has at least one processor 202 and a memory 204. In its most basic configuration, computing system 200 is illustrated in FIG. 2 by dashed line 206 encompassing the processor 202 and the memory 204. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media, such as memory 204, removable storage 208 or non-removable storage 210 includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices. For instance, each platform system 120 and 122 may have communication connections for the PSTN and/or the Internet. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media and communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
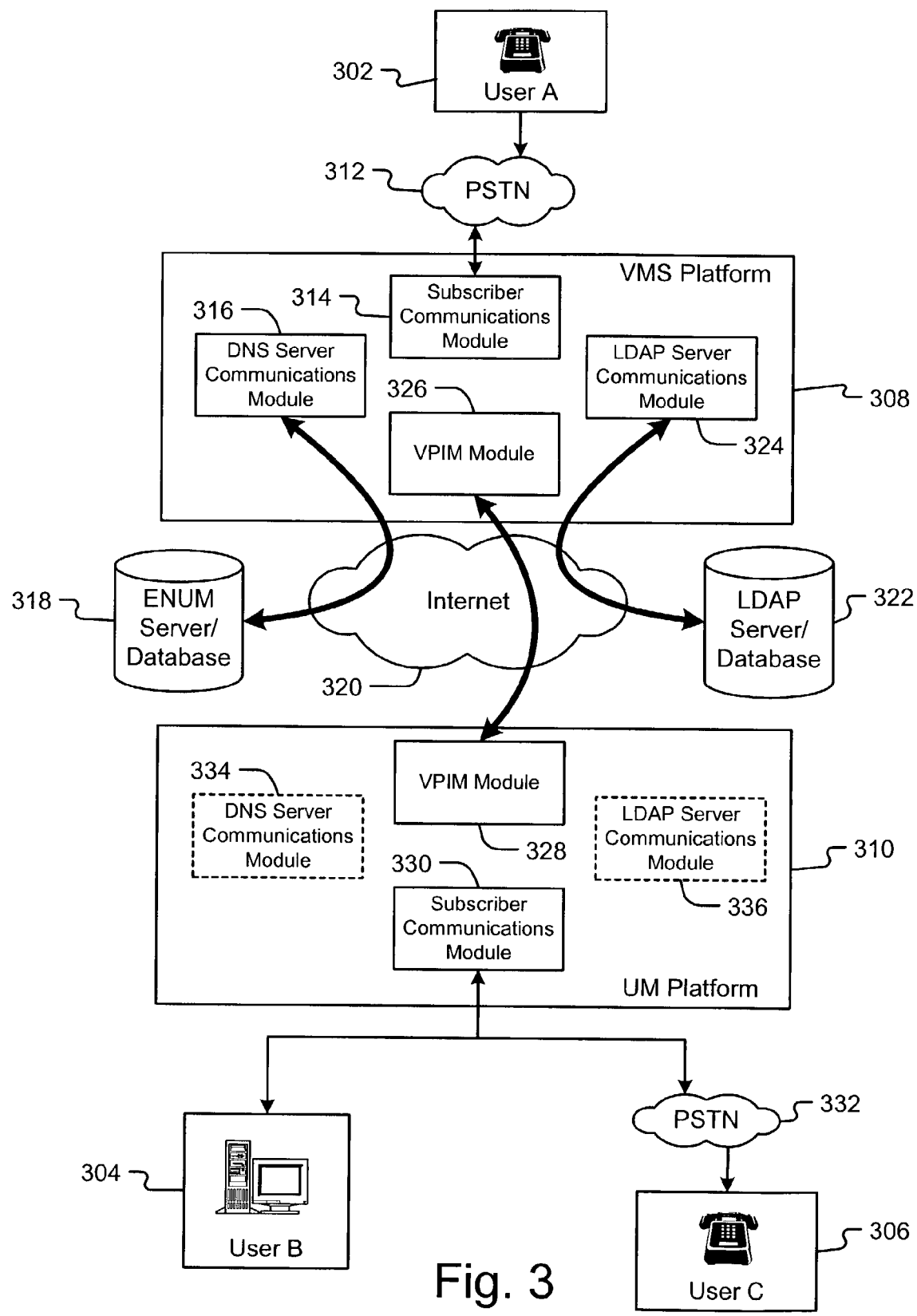
FIG. 3 is a high level environmental depiction of another embodiment of the present invention.

FIG. 3 illustrates another embodiment of the present invention, including software modules that may be incorporated into the environment. In the embodiment depicted in FIG. 3, a first user, i.e., user A 302, is able to forward messages to other users, such as user B 304 and user C 306. As may be appreciated, users 302, 304 and 306 are subscribers to VMS platforms of one form or another but user 302 is specifically not a subscriber to the same VMS platform as either user 304 or user 306. User 302 subscribes to platform 308 while users 304 and 306 are shown as subscribers to the same platform, i.e., unified messaging (UM) platform 310. Unified messaging platforms, such as platform 310 provide messaging capabilities between voice, fax and email type messages. Consequently, users 304 and 306 may be either computer systems, such as user 304 or telephone systems such as user 306.

In this embodiment, user 302 (e.g., a subscriber to platform 308) communicates with platform 308 over a public switched telephone network (PSTN) 312. Communications typically involve listening to and sending or forwarding voice-mail type messages. Platform 308 has a subscriber communications module 314 that provides general communications between the platform 308 and the user 302 over the PSTN 312.

Platform 308 also has a DNS server communications module 316 that communicates with a DNS/ENUM server and database system 318. In an embodiment, such communications occur over the Internet 320, but it is not required. The DNS server system receives requests and queries from the DNS server communications module 316. The requests involve providing a phone number to the DNS/ENUM server 318 in ENUM format and requesting an Internet Protocol address for a directory server, e.g., an LDAP server, such as server 322, associated with the provided phone number. In the embodiment shown in FIG. 3, the LDAP database 322 is associated with the platform 310. The DNS/ENUM server 318 may perform any number of internal lookup functions and/or external requests to locate the address information, such as the IP address for LDAP server 322. In one embodiment, the DNS/ENUM server 318 maintains mapping information for the requested phone numbers. In such an environment, new LDAP servers must register or otherwise alert the DNS/ENUM server 318 of their existence and their IP address.

In a particular embodiment, the DNS server 318 uses the domain "e164.arpa" in order to provide the infrastructure in DNS for storage of E.164 numbers and the NAPTR record within the DNS is used for identifying what services exist for a specific phone number (represented as a domain name, for example 4043322278 is represented as 8.7.2.2.2.3.3.4.0.4.1.e164.arpa). The standard allows for a number of fields in the NAPTR record including: order, preference, service, etc. The order and preference fields specify the order in which records must be processed when multiple NAPTR records are returned in response to a single query.

The platform 308 also has an LDAP server communications module for communicating with LDAP servers. In general, once the DNS server communications module has identified an IP address for an LDAP server, the LDAP server communications module 324 then communicates with that LDAP server, such as server 322 to locate the specific domain name address and routing information needed to uniquely identify the destination user, such as user 304 or user 306. The communication session between module 324 and server 322 typically occurs over the Internet 320, but this is not necessary. Once the destination address information has been resolved, the message to be sent is compiled in VPIM format. In essence, the modules 316 and 324 may be thought of collectively as a destination address resolution module that resolves the destination address for the destination subscriber using the ENUM standard.

Platform 308 has a VPIM module to transform the message into the proper VPIM format. Using the destination information determined from modules 316 and 324, the VPIM module 326 then transmits the message over the Internet 320 to a VPIM module 328 in platform 310 designed to receive such messages. Once received, the platform 310 also has a subscriber communications module 330 for routing the message to the proper mailbox of the proper user, such as user 304 or user 306. Users 304 and/or 306 may then communicate with the platform 310 to retrieve any stored messages. With respect to user 306, such communication may occur via a PSTN 332 or some other communications network.

As may be appreciated, platform 310, in other embodiments, may also have a DNS server communications module 334 and an LDAP server communications module 336 such that platform 310 may be able to send messages to other systems as well.

Figure 4:
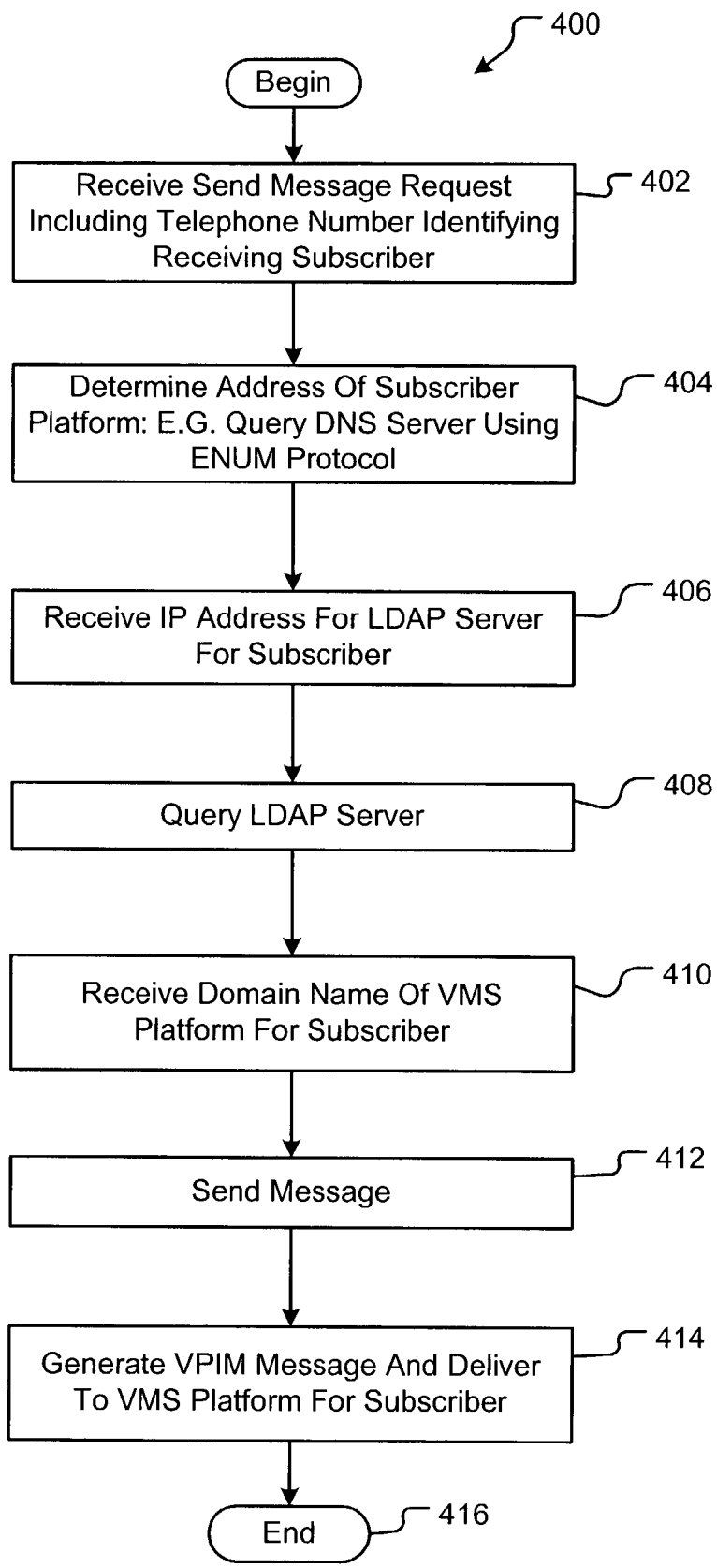
FIG. 4 is a flow diagram that illustrates operational characteristics for packaging and transmitting a voice mail message in accordance with the present invention.

FIG. 4 illustrates the functional components related to intersystem messaging, including determining or resolving the location address according to a particular embodiment of the present invention. Flow 400 begins with receive operation 402 wherein a local or sending platform, such as platform 120 (FIG. 1) receives a request to send a message to a destination subscriber on a destination platform such as platform 122 (FIG. 1). The send message request includes a phone number identifying the destination subscriber, i.e., the subscriber that will receive the message. The requestor in this scenario may relate to a VMS platform subscriber, such as subscribers 108, 110 or 112 (FIG. 1) or another user such as user 302 (FIG. 3), that has access to a VMS platform. In one embodiment, the act of requesting that a message be sent may involve user interaction with the local VMS platform. For instance, the user may initially retrieve a particular message from the local VMS platform, i.e., the platform to which the user subscribes. Upon retrieving the message, the user may determine that the message should be forwarded to another user. Consequently, as part of the local platform interaction, the user requests forwarding as an option. Upon such a request, the local platform may request that the user enter a destination phone number, i.e., an identification of the destination the user desires to send the message.

Next, determine operation 404 determines the address of the subscriber platform, i.e., the platform to which the receiving subscriber belongs. As an intermediate step, determine operation may first determine whether the destination subscriber belongs or subscribes to the local platform. For instance, the local platform receiving the send request may host the sending subscriber and the receiving subscriber and simply forward the message using predetermined routing methods within the closed platform. However, if the destination subscriber is not part of the local platform, determine operation further determines the platform address for the receiving subscriber.

Determine operation 404 queries a domain name server (DNS) to determine the address. In doing so the query includes a request for a destination LDAP server associated with the receiving subscriber's phone number. It is possible that the phone number is not associated with an LDAP server or other messaging system such that the DNS query returns an error or other message indicating that no IP address or mailbox for the phone number was found. Otherwise, the DNS returns the IP address for the LDAP server associated with the destination subscriber to the local platform. As such, receive operation 406 receives the IP address for the proper destination LDAP server.

Next, query operation 408 queries the destination LDAP server for the specific domain name of the destination platform to which the destination subscriber subscribes. The destination LDAP server is similar to a directory having all the location information for all of its members, wherein a member may be a platform, whether voice mail only or unified messaging. However, the destination LDAP server also has information related to each subscriber, such that the destination LDAP server may return an IP address for a particular subscriber's platform in response to a request that includes the subscriber's telephone number. As such, receive operation 410 receives the IP address for the destination subscriber, including domain name of the destination platform.

Following receive operation 410, send operation 412 sends a message to the destination subscriber. In an embodiment, a new message may be recorded to accompany the message. Alternatively, send operation simply sends the prerecorded message. Importantly, send operation 412 includes the destination IP address for the destination subscriber. In an embodiment, the send operation relates to the user identifying the message to be sent and sending a command to the local platform to send or transmit the message. Such a command may be incorporated in the initial send request or, as shown in FIG. 4, relate to a separate command request performed by the user.

In an embodiment, upon receiving the send command 412, generate operation 414 generates a VPIM message using the received message and the destination address. Upon generating the VPIM message, the message is then delivered to the destination subscriber. In one embodiment, the delivery involves sending the message over the Internet to the destination IP address in a known manner. Upon sending the message, flow 400 ends at end operation 416. In this embodiment, the sending platform supports the VPIM standard for intersystem messaging. Additionally, the destination platform is capable of accepting a VPIM formatted voice or fax message. Typically, upon receiving the VPIM message, the destination platform accepts the message and deposits it into the voice mail of the destination subscriber.

ENUM can be used to register numerous services besides Voice over IP. Because telephone numbers will be stored in the DNS, any device that has access to the Internet should be able to look up that telephone number as an Internet address. That device will be able to tell what other services are ENUM-registered and can be accessed for that telephone number. For email, rather than typing in an email address, the sender could type in the recipient's telephone number. A fax machine could send a document to an email address, or a computer could email a document to a fax machine. ENUM also offers the promise of providing a single point of contact for multiple communication devices, from phones to personal computers to fax machines, possibly important for unified communications offerings.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of sending a message from one platform to a subscriber on another platform, the method comprising:
    sending a request for subscriber address information to a domain name server, the request identifying a telephone number for the subscriber, the request comprising a query indicating a naming authority pointer record stored on the domain name server, the query configured to determine available services for the subscriber, wherein the available services include ENUM-registered services, wherein sending the request for subscriber address information to the domain name server comprises;
        sending the telephone number to the domain name server,
        requesting an IP address for a directory server associated with the telephone number,
        obtaining mapping information from the domain name server for the telephone number, and
        accessing at least one available Internet resource for the telephone number, wherein the at least one available Internet resource comprises one of the following: an IP telephony address, an e-mail address, a Web address, and the address of a directory server;
    receiving address information from the domain name server assigned to the subscriber wherein the address information received from the domain name server identifies a directory server associated with the subscriber;
    using the address information, sending the message in a predetermined format to the other platform, wherein the predetermined format is a voice profile for internet mail (VPIM) format and wherein sending the message comprises,
        receiving a user input configured to initiate sending the message,
        recording, after receiving the user input configured to initiate sending the message and in response to receiving the user input configured to initiate sending the message, an accompanying message, and
        generating, in response to receiving the user input, the message in the predetermined format, using the message, the address information, and the accompanying message;
    querying the directory server for specific address information for the subscriber, wherein of query includes the telephone number or the subscribe; and
    receiving an internet address for the subscriber from the directory server; and wherein the act of sending the message uses the internet address for the subscriber.

2. A method as defined in claim 1 wherein the act of domain name server resolves the address information using ENUM standard.

3. A method as defined in claim 2 wherein the other platform receives the message and routes the message to the subscriber.

4. A method as defined in claim 2 wherein the Internet is used to transfer messages and requests.

5. A method as defined in claim 1 wherein the one platform is a voice mail system and the another platform is a unified messaging platform.

6. A method as defined in claim 5 wherein the another platform includes a computer system.

7. A method as defined in claim 5 wherein the another platform includes a telephone system.

8. A computer program product on a computer storage media, the computer program product having computer-executable instructions for performing the steps recited in claim 1.

9. The method of claim 1 further comprising:
    requesting the telephone number for the subscriber from the user; and
    receiving the telephone number for the subscriber from the user.

10. A method as defined in claim 1 wherein sending the message in a predetermined format to the other platform comprises at east one of the following:
    receiving a telephone number, wherein a recipient's telephone number is used to send an email;
    receiving an email address, wherein the email address is used by a fax machine to send an email; and
    utilizing a single point of contact to send the message to multiple communication devices.

11. A computer platform providing intersystem messaging, the platform having one or more subscribers wherein the subscribers use the platform to access messaging services, the platform comprising:
    a subscriber communications module for communicating information between a subscriber and the platform;
    a message delivery module for sending a message from within the platform to a destination platform in a predetermined format wherein the predetermined format is voice profile for internet mail (VPIM), the message including a first portion comprising information a user designates to be forwarded to the subscriber and a second portion recorded by the user to accompany the information the user designates to be forwarded to the subscriber after the user initiated a send operation, the second portion being recorded after and in response to the user initiating the send operation; and a destination address resolution module for resolving a destination address for a subscriber associated with the destination platform, the destination address resolution module using the ENUM standard to resolve the destination address information, wherein the destination address resolution module further comprises;

a domain name server communications module for communicating with a domain name server to get an address of a directory server and a naming authority pointer record, wherein the naming authority pointer record is configured to determine available services for the subscriber, wherein the available services include ENUM-registered services, wherein communicating with a domain name server to get an address of a directory server comprises:

sending the telephone number to the domain name server, requesting an IP address for a directory server associated with the telephone number obtaining mapping information from the domain name server for the telephone number, and accessing at least one available Internet resource for the telephone number, wherein the at least one available Internet resource comprises at least one of the following: an IP telephony address, an e-mail address, a Web address, and the address of a directory server, and a directory server communications module for communicating with a directory server to resolve address information for the destination subscriber.

12. A computer platform as defined in claim 11 wherein the platform is a voice mail only platform.

13. A computer platform as defined in claim 11 wherein the platform is a unified messaging platform.

14. The method of claim 11 wherein the destination address resolution module is configured to provide an e-mail address for the subscriber as the destination address in response to receiving a telephone number for the subscriber.

15. A method of sending a message from one platform to a subscriber on another platform, the method comprising:

sending request for subscriber address information to a domain name server, the request identifying a telephone number for the subscriber, wherein sending the request for subscriber address information to the domain name server comprises:

sending the telephone number to the domain name server, requesting an IP address for a directory server associated with the telephone number obtaining mapping information from the domain name server for the telephone number, and accessing at least one available Internet resource for the telephone number, wherein the at least one available Internet resource comprises at least one of the following: an IP telephony address, an e-mail address, a Web address, and the address of a directory server;

receiving address information from the domain name server assigned to the subscriber, wherein receiving the address information further comprises receiving a naming authority pointer record stored on the domain name server, the naming authority pointer record configured to determine available services for the subscriber, wherein the available services include ENUM-registered services; and using the address information, sending the message in a predetermined format to the other platform, wherein sending the message comprises, receiving a user input configured to initiate sending the message, recording, after receiving the user input configured to initiate sending the message and in response to receiving the user input configured to initiate sending the message, an accompanying message, and generating, in response to receiving the user input, the message in the predetermined format, using he message, the address information, and the accompanying message.

16. A method as defined in claim 15 wherein the act of domain name server resolves the address information using ENUM standard.

17. A method as defined in claim 16 wherein the other platform receives the message and routes the message to the subscriber.

18. A method as defined in claim 16 wherein the Internet is used to transfer messages and requests.

19. A method as defined in claim 15 wherein, the one platform is a voice mail system and the another platform is a unified messaging platform.

20. A method as defined in claim 19 wherein the another platform includes a computer system.

* * * * *